United States Patent [19]
Handa

[11] 3,955,306
[45] May 11, 1976

[54] HANDY LIVE BAIT BUCKET

[76] Inventor: David H. Handa, 4N525 Rte. 83, Bensenville, Ill. 60106

[22] Filed: May 27, 1975

[21] Appl. No.: 580,615

[52] U.S. Cl. ................................................. 43/56
[51] Int. Cl.[2] ........................................ A01K 97/04
[58] Field of Search ................. 43/55, 56, 57, 54.5; 220/262, 263, 264

[56] References Cited
UNITED STATES PATENTS

| | | | |
|---|---|---|---|
| 299,690 | 6/1884 | Sherwood | 43/56 |
| 713,890 | 11/1902 | Koch | 43/56 |
| 1,897,571 | 2/1933 | Camporini | 43/56 |
| 2,002,572 | 5/1935 | Forbes et al. | 43/56 |
| 2,613,843 | 10/1952 | Suda | 43/56 |
| 3,000,132 | 9/1961 | Koistinen | 43/56 |
| 3,039,225 | 6/1962 | Semelka | 43/56 |

*Primary Examiner*—Warner H. Camp
*Attorney, Agent, or Firm*—David D. Kaufman

[57] ABSTRACT

A live bait bucket of customary double-container arrangement. The inner container is provided with a vertically movable scoop and a hinged lid for closing the access opening in the container. The lid is formed with an elongated slot and a pull rod connected to the scoop projects up through the slot. Abutment means are mounted on the pull rod and slidably engage the underside of the lid so that lifting of the pull rod simultaneously opens the lid. Spring means are provided for automatically closing, and retaining closed, the lid when the pull rod is released.

8 Claims, 4 Drawing Figures

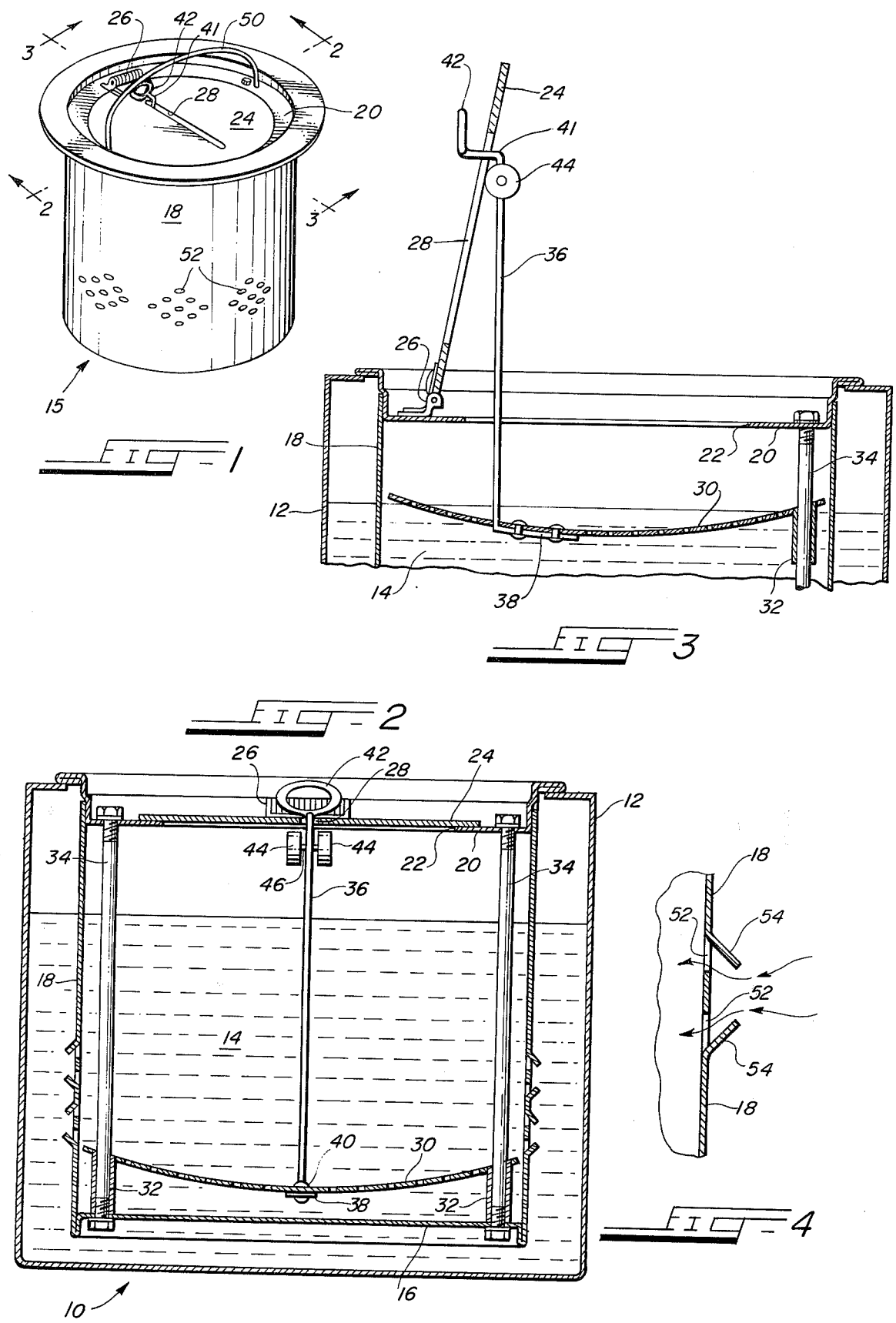

HANDY LIVE BAIT BUCKET

This invention relates to live bait or minnow buckets and more particularly to an improved structure which facilitates bait retrieval and ensures safe retention of the live bait under virtually all conditions of normal use.

The basic well-known bait bucket comprises a lid-covered perforated or porous container which fits removably within an outer, imperforate or non-porous, open-topped container. The water for the live bait is retained by the outer container when the bucket is resting in the boat or on dry land. If desired, the inner container may be suspended and immersed in the ambient body of water and withdrawn each time a new bait is needed. During such suspended immersion, care must be exercised against the possibility that water currents or inadvertent bumps of the container against the boat or other obstacles will cause the lid to open and permit escape of the bait. Of course, each time a bait is needed the fisherman must insert his hand and arm deeply into the bucket and grope rather blindly until an elusive minnow or the like is caught. This is a frustrating and time-consuming exercise which has been experienced by many. Despite all of these shortcomings, this type of bait bucket is still the one most widely used by fishermen.

There have been numerous attempts to provide an improved bait bucket which overcomes the described problems, but they have also been characterized by disadvantageous features which have militated against their widespread adoption and use. Thus, for example, it has been suggested that a flexible net be pivotally incorporated as a scoop (e.g., U.S. Pat. Nos. 3,039,225 and 3,319,372), but such nets invariably miss or fail to scoop up many of the minnows in the bucket. Others have suggested rather complex gating and metering devices (e.g., U.S. Pat. Nos. 3,380,186; 3,513,584; 3,550,307; and 3,834,062) which not only are cumbersome and difficult to operate, but also sacrifice use of the bucket as an immersible flow-through bucket. Still others have suggested rather sophisticated devices including aerating means and cooling chambers (e.g., U.S. Pat. Nos. 3,726,039 and 3,831,310), which are not only expensive but also require a number of separate and time-consuming hand manipulations for their operation.

It is, therefore, the principal object of this invention to provide an improved live bait bucket which overcomes or alleviates all of the problems described hereinabove.

Another object is to provide a bait bucket of the character described in which a single lifting manipulation with one hand simultaneously opens the lid to the container and makes accessible all of the bait contained therein. A related object is to provide such a bait bucket in which release by the manipulating hand results automatically in closing of the container and return of the unused bait back into the water contained therein.

A further object is to provide a bait bucket of the character described utilizing the basic porous inner and nonporous outer containers so that the inner container may be immersed in ambient water as a flow-through bucket for maintenance of the bait in a fresh and active condition.

Still another object is to provide a bait bucket of the character described having automatic means for ensuring against inadvertent opening of the container lid and escape of the bait while immersed as a flow-through bucket.

Yet a further object is to provide a bait bucket of the character described which may be inexpensively fabricated and yet is simple to operate, durable and most efficient for the purposes intended.

With the foregoing and other objects in view which will appear as the description proceeds, the invention comprises generally a porous, inner cylindrical container adapted to be removably received within an outer, non-porous container. A circular strainer or scoop with dimensions substantially identical to the inner diameter of the inner container is positioned therein and mounted on a plurality of vertical guide rods for pure vertical movement. A lid is pivotally attached to the inner container and is provided with a diametral slot. A pull rod is connected to the strainer and projects upwardly through the lid slot, and slide or roller means are associated with the lid and pull rod so that vertical movement of the latter simultaneously raises the strainer and opens the lid. Spring means are provided which automatically close the lid and lower the strainer to the bottom of the container when the pull rod is released. The spring means likewise ensure against inadvertent opening of the lid when the container is used as a flow-through bucket.

For the purpose of facilitating an understanding of my invention, I have illustrated in the accompanying drawings a preferred embodiment thereof, from an inspection of which, when considered in connection with the following description, its mode of construction, assembly and operation, and many of its advantages should be readily understood and appreciated.

Referring to the drawings in which the same reference characters are employed to indicate corresponding or similar parts throughout the several figures of the drawings:

FIG. 1 is a perspective view of a live bait bucket embodying the principles of the invention showing the inner container removed from its cooperating outer container;

FIG. 2 is a vertical sectional view taken on the plane of line 2—2 in FIG. 1, viewed in the direction indicated, and showing the complete assembly including the outer container;

FIG. 3 is a fragmentary vertical section view, similar to FIG. 2, but taken on the plane of line 3—3 in FIG. 1 and showing the lid open and the scoop in the upraised position for bait retrieval; and FIG. 4 is an enlarged sectional view showing a detail of construction of the inner container.

Referring more particularly to the various Figures of the drawing, it will be seen that the reference character 10 designates a live bait bucket embodying the principles of the invention. The bucket 10 comprises an outer container 12 and an inner container 15 nestably positioned therein. Outer container 12 may be filled to the desired level with water as indicated at 14.

Inner container 15 comprises a bottom wall 16, a side wall 18 and a top wall 20 having a circular access opening 22 therein. Access opening 22 is closed by a lid 24 pivotally connected to the top wall 20 by a spring-loaded hinge 26 which normally urges the lid into the closed condition. Lid 24 is likewise formed with a central diametral slot 28 for reasons which will become apparent as the description proceeds.

Positioned within the container 15 is a perforated disc or scoop 30 whose diameter is substantially the same as, that is, only slightly smaller than the inner diameter of the container wall 18. Since there is insufficient clearance between the scoop 30 and the side wall 18, all bait in the container necessarily will be carried upwardly by movement of the scoop. The scoop 30 is retained for vertical movement only by sleeves 32 slidably mounted on guide rods 34 connected between the bottom and top walls 16 and 20 of the container 15. In the preferred embodiment illustrated there are three guide rods 34 although two or more than three may also be employed.

A slender pull rod 36 is rigidly connected to the scoop 30, said connection comprising a bottom leg 38 and rivets 40. Pull rod 36 extends vertically above the lid 24 through the slot 28 which is only wide enough to nicely, but slidably, accommodate the pull rod therethrough. At its upper end, the pull rod 36 is bent to provide a substantially horizontal leg 41. Mounted on the free end of the leg 41 is a generally vertical handle which may be of any suitable shape, but I prefer an eyelet 42 which is annular or ovate and of sufficient size to accommodate one or two fingers.

A pair of rollers 44, 44 is mounted on opposite sides of the rod 36 below the lid 24 by means of an axle or stub shaft 46. The rollers 44 are spaced sufficiently and adapted to engage the underside of the lid 24 on either side of the slot 28 and roll therealong when the pull rod 36 is raised. Other forms of pivotal or non-rotatable abutment means may be substituted for the rollers 44, but the latter are preferred for easiest, friction-free operation.

Operation of the bait bucket 10 is as follows. When bait retrieval is desired, the user simply grasps the handle 42 with one or two fingers and lifts upwardly. Upward movement of the rod 36 and scoop 30 causes the rollers 44 to engage the lid 24 and pivot the same about the hinge 26. As this motion continues, the rod 36 traverses the slot 28 from one extremity thereof to the other at which time the lid is in the fully opened condition of FIG. 3. At that time, the scoop 30 has carried with it all of the bait within the container where it is visibly and easily accessible to retrieval with the fisherman's other hand. To close the bucket, it is simply necessary to release the handle 42 whereupon the spring-loaded hinge 26 and the weight of the scoop 30 simultaneously cause the lid to close and the scoop to return to its lowermost rest position as shown in FIG. 2.

If it is desired to use the inner container 15 as a flow-through bucket, it may be removed from the outer container 12 and suspended, by the bail 50, into the ambient water. In this function, the spring-loaded hinge 26 prevents against inadvertent opening of the lid 24 by waves or bumps. Similarly, the weight of the scoop 30 causes the leg 41 and handle 42 to exert a camming action against the lid 24 to further guard against inadvertent opening. In this regard, my invention contemplates any form of spring urged closure of the lid and return lowering of the scoop 30. Thus, for example, hinge 26 may comprise a simple hinge and springs could be mounted over the guide rods 34, thereby bearing against the top wall 20 and scoop and sleeves 30 and 32 to acieve the same automatic closure.

As many fishermen can attest, minnows or other bait sometimes die from bumping against the wall of the closely confining bucket caused by strong water currents flowing through the immersed bucket. Referring to FIG. 4 of the drawings, it will be seen that the side wall 18 of the container 15 is formed with groups of perforations 52 as is customary. It will be noted, however, that the perforations 52 are not completely cut through the wall 18. Instead, the perforations 52 are only partly punched out to leave baffles 54 which serve to break up strong currents and maintain the water within the container 15 in a calmer state.

What I claim is:

1. A live bait bucket comprising:
   a container having a top wall, a bottom and a side wall, said top wall being formed with an access opening therein;
   a lid pivotally connected to said container and adapted to releasably close said access opening, said lid being formed with a slot therein;
   a scoop mounted in said container for vertical movement therein, said scoop having the same configuration and substantially the same dimensions as the inside surface of said side wall;
   a pull rod rigidly connected to said scoop and projecting upwardly therefrom and through the slot in said lid;
   abutment means mounted on said pull rod and positioned to engage the underside of said lid, whereby the upward lifting of said pull rod simultaneously opens the lid of the container; and
   spring means associated with said top wall and normally urging said lid into the closed position and said scoop into its lowermost position.

2. The bait bucket of claim 1 in which said spring means comprises a spring-loaded hinge pivotally connecting said lid to said top wall.

3. The bait bucket of claim 1 and comprising further:
   a plurality of vertical guide rods connected between said top and bottom container walls; and
   means mounting said scoop on said guide rods so that scoop is capable only of vertical movement.

4. The bait bucket of claim 3 and comprising further a handle on the top end of said pull rod, said handle being shaped and positioned so that it engages the top surface of said lid and exerts a closing action thereon when said scoop moves downwardly.

5. The bait bucket of claim 4 in which said spring means comprises elongated springs mounted on said guide rods and bearing against said top wall and said scoop to normally urge said scoop downwardly.

6. The bait bucket of claim 1 in which said abutment means comprises a pair of rollers rotatably mounted on said pull rod and adapted to engage the underside of the lid on opposite sides of said slot, whereby said pull rod traverses said slot during the lifting thereof and opening of said lid.

7. The bait bucket of claim 1 and comprising further a plurality of openings formed in said container side wall and baffles adjacent said openings adapted to prevent turbulent flow of water therethrough.

8. The bait bucket of claim 7 and comprising further a second container which is imperforate and of complementary configuration with said first-mentioned container, said second container adapted to nestably receive said first-mentioned container therein.

* * * * *